United States Patent [19]

Miyazaki et al.

[11] 3,895,040

[45] July 15, 1975

[54] METHOD FOR MANUFACTURE OF FATTY ACIDS AND DIBASIC ACIDS

[75] Inventors: Shoji Miyazaki, Ohmiya; Yasuo Suhara, Zama-Machi, both of Japan

[73] Assignee: Agency of Industrial Science & Technology, Tokyo, Japan

[22] Filed: Oct. 16, 1972

[21] Appl. No.: 297,727

[30] Foreign Application Priority Data

Oct. 15, 1971   Japan................................ 46-80902
Nov. 15, 1971   Japan................................ 46-9124

[52] U.S. Cl. .......... 260/413; 260/531 R; 260/537 P
[51] Int. Cl. ............................................. C08h 17/36
[58] Field of Search ............. 260/413, 531 R, 537 P

[56] References Cited

UNITED STATES PATENTS

| 2,373,942 | 4/1945 | Bergsteinsson .................. 260/635 H |
| 3,075,997 | 1/1963 | Tschesche et al. ........... 260/531 R X |
| 3,173,933 | 3/1965 | Hay ...................................... 260/413 |
| 3,238,250 | 3/1966 | Bailey ................................. 260/514 |
| 3,671,583 | 6/1972 | Griot et al. .................. 260/531 R X |

FOREIGN PATENTS OR APPLICATIONS

| 938,932 | 10/1963 | United Kingdom............. 260/347.3 |
| 534,525 | 3/1941 | United Kingdom............. 260/531 R |

OTHER PUBLICATIONS

Lebedeva et al., C.A. 4425i (1954).

Gemant, C.A. 50, 36e.

*Primary Examiner*—Lewis Gotts
*Assistant Examiner*—Ethel G. Love
*Attorney, Agent, or Firm*—Kurt Kelman

[57] ABSTRACT

An $\alpha, \omega$-glycol, a primary alcohol or an aliphatic compound having one or two secondary alcohol groups is dissolved in a solvent. The resulting solution is heated to 10° – 70°C and brought into contact with an ozone-containing gas. Then, the solution is elevated to 70° – 110°C and brought into contact with an oxygen-containing gas. By thus oxidizing the starting material, there is formed in the solution a dibasic acid or a fatty acid; the former acid occurs where the starting material being used is an $\alpha, \omega$-glycol and the latter acid occurs where it is either a primary alcohol or an aliphatic compound having one or two secondary alcohol groups. The dibasic acid or fatty acid thus formed within the solution can be isolated by removing the solvent from the solution.

15 Claims, No Drawings

METHOD FOR MANUFACTURE OF FATTY ACIDS AND DIBASIC ACIDS

This invention relates to a method for the manufacture of a dibasic acid from an α, ω-glycol and a fatty acid from a primary alcohol or an aliphatic compound having one or two secondary alcohol groups, which method is characterized by using ozone as the oxidizing agent. More particularly, the present invention relates to a method for manufacturing a dibasic acid by oxidizing an α, ω-glycol thereby converting the two carbinol-carbons thereof into carboxylic groups, a fatty acid by oxidizing a primary alcohol thereby converting the carbinol-carbon thereof into carboxylic groups, and a fatty acid by oxidizing an aliphatic compound possessed of one or two secondary alcohol groups thereby converting the carbinol-carbon thereof alone or in conjunction with the adjoining carbon thereof into carboxylic groups, which method is characterized by using ozone as the oxidizing agent.

A very wide range of uses are found for dibasic acids as industrial raw materials. Fatty acids are extremely important in that they are used as raw materials for the production of oils and fats.

In the conventional methods for the manufacture of dibasic acids and fatty acids by the oxidation of the starting materials mentioned above, there have chiefly been used inorganic acids, alkalis, inorganic salts, etc. as oxidizing agents.

In these known methods, the oxidizing agents used are in a solid or liquid state. Thus, the conventional methods have proved to be disadvantageous in various aspects: Troublesome handling of oxidizing agents is one conspicuous disadvantages. It is another disadvantage that, as measures indispensable for the isolation of dibasic acids or fatty acids as final products subsequent to the completion of the reaction, these methods require various additional aftertreating processes as for concentration and neutralization of inorganic acids, alkalis, etc. remaining in the reaction solutions and for recovery, regeneration, etc. of metal compounds, for example.

Other methods have also been suggested for the manufacture of dibasic acids. These methods aim to accomplish the formation of dibasic acids by effecting addition or subtraction of carbon atoms by means of various derivatives. Three such methods represented by the formulas below have, as is evident from the formulas, a disadvantage in that they involve quite complicated processes.

1. Halogenide $\xrightarrow{Nitrile\ substitution}$ Cyanide $\xrightarrow{Hydrolysis}$ Dibasic acid
2. Dibasic acid ester $\xrightarrow{Reduction}$ Glycol $\xrightarrow{Halogenation}$ Halogenide $\xrightarrow{Nitrile\ substitution}$ Cyanide $\xrightarrow{Hydrolysis}$ Dibasic acid
3. Barium salt of dibasic acid $\xrightarrow{Carbonization}$ Ketone $\xrightarrow{Oxidation}$ Dibasic acid The present invention is characterized by using ozone as the oxidizing agent. Now, an explanation will be made of a known method in which ozone is used as the oxidizing agent.

The reaction of a monohydric alcohol with ozone is touched upon in Annalen der Chemie, Ann. 476, 233 (1930). This reaction is not intended for the manufacture of carboxylic acids. The reaction is described to have given rise to acids, aldehydes, peroxides, etc. as products. The method described in the said journal is such that a reactive gas is caused to react directly on an alcohol at low temperatures. Thus, the substances used as raw materials therein are limited to those which melt below 0°C and have small molecular weights. Substances which have higher melting points and larger molecular weights cannot be used for the purpose of this method. Under the reaction conditions involved therein, peroxides tend to accumulate in the reaction product. This implies that meticulous care must be taken in the treatment of the reaction product. These disadvantages have so far prevented this method from being put to practice on a commercial scale.

In one known method for the manufacture of adipic acid by the oxidation of cyclohexanol, ozone is allowed to exist as the catalyst in an extremely small quantity not exceeding 0.1% in the said oxidation.

The main object of present invention is to provide a method for manufacturing dibasic acids or fatty acids in high yields by using gaseous oxidizing agents which are easy to handle and which have an intense oxidizing property.

Another object of this invention is to provide a method for manufacturing dibasic acids or fatty acids, which method permits easy treatment of reaction products and entails virtually no formation of wastes.

Other objects and other characteristic features of this invention will become apparent from the further description of invention to be given hereinafter.

When an α, ω-glycol, a primary alcohol or an aliphatic compound having one or two alcohol groups is subjected to the oxidation treatment, there are formed carboxylic groups which give rise to a dibasic acid or a fatty acid as illustrated below, depending on whether the starting material to be used is an α, ω-glycol, a primary alcohol or an aliphatic compound having one or two alcohol groups.

I. An α, ω-glycol as the starting material:

II. A primary alcohol as the starting material:

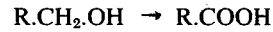

III. An aliphatic compound having secondary alcohol group as the raw material:

1. In the case of an aliphatic compound having one secondary alcohol group

In this case, the carbinol-carbon and its adjoining carbon are oxidized into carboxylic groups which generally give rise to four kinds of fatty acids as shown below.

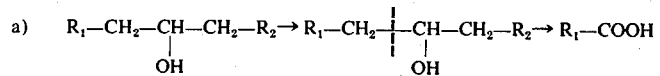

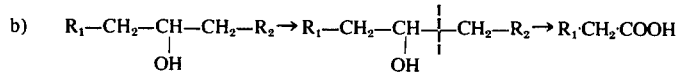

2. In the case of an aliphatic compound having two secondary alcohol groups

When this compound has two secondary alcohol groups in adjoining positions, there are produced two fatty acids as shown below.

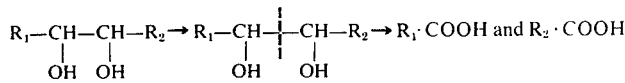

When the two secondary alcohol groups of this compound are not in adjoining positions, the compound undergoes cleavage in the same manner as shown in (1) above, with the result that there are formed many kinds of acids. In such reaction, the position of cleavage inclines to one side under the influence of such factors as position of hydroxyl group attachment, other molecular structure and conditions of experiment. This means that all the fatty acids are not equally produced as may be expected from the molecular structure of the starting raw material. In the treatments for the oxidation of raw materials mentioned above, there have heretofore been used acids, alkalis, inorganic salts, etc. as oxidizing agents. As already described, however, these methods have required adoption of special measures for the handling of oxidizing agents, the aftertreatment of reaction products, etc. In the meantime, experiments have been carried out on methods which resort to the use of gaseous oxidizing agents such as oxygen and ozone in place of these inorganic substances. These methods have never been developed to the extent of practical use, for they fail to give products in sufficiently high yields.

The inventors pursued a study in search for an oxidizing method capable of giving desired products by the use of gaseous oxidizing agents such as ozone and oxygen. Consequently, they have acquired knowledge that desired acids are obtained in high yields by first dissolving starting materials in a solvent, slightly heating the resultant solutions (to 10°–70°C) and simultaneously treating with an ozone-containing gas, and subsequently treating the solutions with an oxygen-containing gas at a slightly higher reaction temperature (70°–110°C) than the former reaction temperature.

The present invention has been accomplished on the basis of the knowledge just mentioned. The method of this invention for the manufacture of various acids will be described in detail below.

As is clear from the definition, the raw material $\alpha, \omega$-glycol is a glycol which has two primary alcohol groups. So far as the glycols cited in preferred embodiments dealt with in the specification of this invention are concerned, the largest number of carbon atoms contained in any one glycol is 10. Since the reaction according to the present invention is effected by using a solvent, it can be applied to glycols of high melting points. As the starting material, therefore, glycols having up to about 20 carbon atoms can be used in this reaction. The $\alpha, \omega$-glycols to be used in the reaction may be those of straight chain type or of branched chain type. As the raw material for the present purpose, primary alcohols having up to about 30 carbon atoms and having the shape of a straight chain or branched chain may be used. Aliphatic compounds having one or two secondary alcohol groups may be of straight chain type or branched chain type for the purpose of this reaction. Aliphatic compounds having up to about 30 carbon atoms are usable.

As the reaction solvent suitable for the method of this invention, there may be used water, organic solvents, mixtures of water with organic solvents and the like. It is naturally important that these solvents should be selected properly by taking into consideration solubility and other factors of the raw material being used. The major requirements which the reaction solvent to be used for this invention is expected to fulfill are that it should remain stable during its contact with ozone, that it should provide sufficient solution of the raw material, that it should not react upon the raw material or the reaction products, that it should permit smooth progress of oxidation reaction, and that it should possess as low degree of inflammability as possible, for example. The solvents which satisfy all these requirements are lower fatty acids such as, for example, formic acid, acetic acid and propionic acid. Of these acids, particularly suitable is acetic acid. Where such an acid solvent is used in the reaction, it is preferable to have a small amount of water incorporated in the acid solvent. This is because the water serves to suppress possible esterification between the alcohol as the raw material and the acid solvent and contributes to safe progress of the reaction aimed at.

Now, an explanation is given to the ratio at which the raw material and the solvent are mixed. Desirably, the amount of the raw material should be limited to within 60g per 100 ml of the solvent for the following reason. Generally, the reaction solution assumes too high viscosity to permit thorough distribution of reaction heat or to obtain sufficient contact with the reaction gas when the concentration of the raw material with respect to the solvent exceeds this upper limit.

As the next step, the solution thus obtained is brought into contact with an ozone-containing gas. Prior to this contact, the solution must be slightly heated. Practically, the temperature to which the solution is required to be heated should fall in the range between 10°C and 70°C. The reaction velocity is extremely low when the temperature fails to reach the lower limit of 10°C. When the temperature exceeds the upper limit of 70°C, however, a secondary reaction giving rise to a by-product tends to accompany the reaction. The reaction temperature is required to be selected from within the said range of temperatures, so as to suit the raw material being used. Generally, relatively low temperatures in the said range suffice for the reactions using, as the raw material, $\alpha, \omega$-glycols, primary alcohols and aliphatic compounds having two secondary alcohol groups in adjoining positions. Relatively high temperatures in the said range are desirable for the reactions using aliphatic compounds having two secondary alcohol groups in non-adjoining positions and aliphatic compounds having one secondary alcohol group.

The ozone-containing gas with which the solution is brought into contact may preferably have an ozone content in the range of 1 to 6 percent by weight. When the ozone content fails to reach the lower limit of 1 percent by weight, the oxidation reaction proceeds at too low velocity to make the reaction worthy of practical use. Any ozone content exceeding the upper limit of 6 percent by weight is disadvantageous, because the reaction occurs vigorously and tends to give rise to by-products. The ozone-containing gas to be used for the present invention may be obtained by partially ozonizing oxygen or air. The gas thus obtained may further incorporate therein other inert gases which have no adverse effects upon the intended reaction.

The contact between the solution of the raw material and the ozone-containing gas may be accomplished by means of an ordinary gas-liquid contact device. It may otherwise be accomplished by using a known method whereby the ozone-containing gas is introduced with agitation into the solution. The quantitative relationship between the solution having the raw material dissolved in the solvent and the ozone-containing gas is governed by the fact that the carbinol-carbon present in the raw material reacts equimolarly with ozone. To be specific, the said relationship should be determined on the basis of the stoichiometric quantity of ozone required for the purpose of the reaction, while simultaneously taking into consideration contact efficiency and other similar factors obtainable with the equipment and the method being used for the reaction.

By such contact reaction (first-stage reaction) with ozone, the raw material in the solution is converted into a dibasic acid plus a small proportion of unstable oxygen compound or a fatty acid plus a small proportion of unstable oxygen compound.

The solution which has undergone the first-stage reaction is now brought into contact with oxygen or air (as the second-stage reaction). This contact is made for the purpose of causing small amounts of unstable oxygen compounds like peroxides and carbonyl compound present in the solution to be completely oxydized into carboxylic acids.

Therefore, conditions under which the solution is brought into contact with the oxygen-containing gas are variable with the quantity of the unstable oxygen compounds present in the solution, the type of the air-liquid contact device to be used, and other similar factors. The minimum requirements in this case are that the quantity of oxygen to be supplied should be sufficient for thorough stabilization of the unstable oxygen compounds and that the solution should be slightly heated in advance so as to ensure smooth progress of the reaction. The extent to which the secondstage contact reaction has proceeded can be found by the determination of peroxide number, carbonyl number and the like.

The temperature at which this contact reaction proceeds is higher than that of the first-stage reaction. The solution, therefore, is required to be elevated to temperatures in the range of 70°C to 110°C. In this case, the oxidation does not sufficiently proceed when the temperature fails to reach the lower limit of 70°C. When the temperature exceeds the upper limit of 110°C, however, the reaction tends to entail secondary reactions. This contact, if allowed to continue too long, may cause the reaction product to undergo secondary reactions. To preclude such undesirable secondary reactions, therefore, it is preferable to terminate the contact within a period of about 2 hours.

Although the said reaction proceeds even in the absence of a catalyst, it can be caused to proceed at a heightened velocity by the presence of a catalyst. Effective catalysts for this reaction are acetates of Mn, Co, Cr, Fe, Cu, etc. Desirably, the quantity of catalyst is in the range of from $0.5 \times 10^{-3}$ g.atom to $5 \times 10^{-3}$ g.atom as metal element per mol of the raw material compound. The catalyst does not manifest its effect in the reaction when the quantity fails to reach the lower limit of this range. Any excess catalyst beyond the upper limit produces no special effect.

The solution obtained in consequence of this reaction generally contains therein the following components.

Where the starting material is an $\alpha, \omega$-glycol, the solution contains as a main component a dibasic acid having the same number of carbon atoms as the said glycol. Besides, a dibasic acid having a smaller number of carbon atoms than the said dibasic acid and other oxidation by-products are present therein in small quantities.

Where the starting material is a primary alcohol, the solution contains as a main component a fatty acid having the same number of carbon atoms as the said primary alcohol. Besides, several fatty acids each having a smaller number of carbon atom than the said fatty acid and other oxidation by-products are present therein in small quantities.

In the case of an aliphatic compound having secondary alcohol groups, the solution contains as main components several fatty acids which are variable, as already mentioned, with the number of carbinol groups and the position at which these groups are attached. Besides, the solution contains smaller amounts of other oxidation by-products.

Isolation of the desired acids from these solutions may be accomplished by using any known method of separation.

Water, organic solvents and mixtures thereof serve as suitable solvents for the reaction of this invention. They invariably have low boiling points. After the reaction, therefore, they can easily be separated from reaction products by distillation or any other known means of separation. The separated solvents may be put to re-use repeatedly.

The spent gas resulting from the said contact reaction may occasionally be found to contain unaltered ozone. Since ozone is readily decomposed into oxygen in the presence of heat, moisture and the like, there is no particularly need for subjecting such spent gas to any after-treatment. If this spent gas is put to reuse repeatedly, then the utility efficiency of ozone can be improved and, at the same time, the necessity for an extra spent gas treatment can be eliminated because no spent gas is allowed to escape from the reaction system.

The method of the present invention described above produces dibasic acids and fatty acids in high yields as illustrated in the preferred embodiments of invention to be given hereinafter. The oxidizing agents to be used by this method are in gaseous state. Thus, the handling of reactants is made easy and the treatment to be given subsequent to the reaction is accomplished with ease. Further, the reaction is carried out under normal atmospheric pressure and the reaction temperature is limited to the low level of 110°C at the maximum. The equipment required for this reaction, therefore, is relatively simple and the maintenance of equipment is quite easy.

The following preferred embodiments are illustrative of the present invention and are not to be regarded as limitative in any way.

EXAMPLE 1:

A three-neck 50-ml reaction flask fitted with a gas inlet, an agitator and a condenser was charged with 4.00g of 1,4-butanediol and 25 ml of 85% aqueous solution of acetic acid. While the solution was kept at 25°C and stirred, an ozone-oxygen mixed gas containing about 3% by weight of ozone was blown in (at a flow volume of 270 ml/minute, under conditions of 22°C and 1 atmosphere) for 12.5 hours. Then, the feed gas was switched to oxygen (delivered at a flow volume of 270 ml/minute) and the reaction allowed to proceed for 30 minutes with the solution elevated to 86°C.

After the reaction, the solvent was removed from the reaction solution by distillation. The residue of distillation was saponified with an alkali solution. The saponified solution was concentrated and subsequently extracted with ether for removal of the unsaponified portion. The ether-treated soap solution was treated with hydrochloric acid to have the soap portion decomposed and then extracted again with ether. Consequently, there was obtained 3.5g of extract (crude succinic acid). Assay conducted by gas chromatography and thin-layer chromatography revealed that this extract contained succinic acid (about 92 percent by weight) as the main component and, in addition thereto, traces of malonic acid and secondary-reaction products. When this acid component was recrystallized from a small amount of water, the component was found by analysis to have a neutralization number 980.5 and a melting point 183°– 184.5°C.

EXAMPLE 2:

The raw materials indicated in Table 1 were treated under the reaction conditions shown in the same table by following the procedure of Example 1. The results of the treatments were as shown under the column titled "Product" in Table 1.

In this table, Mn denotes manganese salt (tetrahydrate) of acetic acid and $C_n$ denotes the number (n) of carbon atoms contained in the indicated dibasic acid.

EXAMPLE 3:

A reaction flask was charged with 4.31g of 1-dodecanol, 0.015g of manganese acetate (tetrahydrate) and 25 ml of 90 percent aqueous solution of acetic acid. The same ozone-containing gas as used in Example 1 was blown into the mixture at 35°C for 4 hours. Then, oxygen was blown in at 85°C for 30 minutes. Consequently, there was obtained 3.71g of reaction product (86 percent by weight based on the raw material). Assay by gas chromatography revealed that this product contained about 72 percent by weight of lauric acid and that, in addition thereto, several fatty acids having smaller numbers of carbon atoms that lauric acid and other secondary-reaction products were present in amounts to fill the balance. This acid component was found to have a neutralization number 301.8.

EXAMPLE 4:

The primary alcohols indicated in Table 2 were used as the raw material and were treated under reaction conditions indicated correspondingly, by following the procedure of Example 1 with necessary modifications.

The results of the treatments were as given in the column titled "Product" in Table 2. In the table, $C_n$ denotes the number of carbon atoms contained in the indicated monobasic acid.

EXAMPLE 5:

A reaction flask was charged with 5.00g of 4-nonyl alcohol and 25 ml of 90 percent aqueous solution of acetic acid. By following the procedure of Example 1 with necessary modifications, the ozone-containing gas was blown into the solution at 70°C for 5 hours for the first-stage reaction and then oxygen was blown in at 85°C for 30 minutes for the second-stage reaction. The reaction product thus obtained was diluted with acetone to a total volume of 50 ml. This solution was qualitatively and quantitatively assayed by gas chromatography. The assay revealed that this solution contained, as fatty acids, 19 percent of propionic acid, 43 percent of butyric acid, 18% of valeric acid and 20 percent of caproic acid (the percentages representing mol percents based on the raw material) and that, in addition thereto, 23 mol percent of unaltered 4-nonyl alcohol and a small amount of secondary oxidation products were present.

EXAMPLE 6:

A reaction flask was charged with 5.02g of 4-nonyl alcohol, 0.03g of manganese acetate (tetrahydrate) and 25 ml of 90 percent aqueous solution of acetic acid. The first-stage reaction was carried out at 70°C for 3.5 hours and the second-stage reaction at 85°C for 30 minutes respectively. The resultant reaction product was assayed. The assay revealed that the fatty acids formed by the reaction were 21 mol% of propionic acid, 41 mol percent of butyric acid, 20 mol percent of valeric acid and 23 mol percent of caproic acid and that 20 mol percent of unaltered 4-nonyl alcohol was also present.

EXAMPLE 7:

A flask was charged with 5.25g of 2-tetradecyl alcohol and 25 ml of 90% aqueous solution of acetic acid. The first-stage reaction was carried out at 40°C for 310 minutes and the second-stage reaction at 85°C for 30 minutes respectively. After the reaction, the solvent was removed from the reaction solution by distillation. The residue of distillation was saponified with an alkali solution. The saponified solution was extracted with ether for the removal of unsaponified portion. The resultant reaction solution was treated with hydrochloric acid to have the soap component decomposed. Subsequently, the solution was extracted with ether to isolate the acid component. Thus was obtained 3.50g of acid component. This acid component was found to have a neutralization number 320. Assay by gas chromatography revealed that the acid component was composed of 45 percent by weight of lauric acid, 27 percent by weight of tridecanic acid, and small amounts of several monobasic acids and secondary-reaction products.

EXAMPLE 8:

A flask was charged with 5.01g of 12-hydroxystearic acid, 0.018g of manganese acetate (tetrahydrate) and 25 ml of 95 percent aqueous solution of acetic acid. The first-stage reaction was carried out at 50°C for 3 hours and the second-stage reaction at 85°C for 30 minutes respectively.

After the reaction, the reaction solution was distilled (∼ 110°C/8 mm.Hg) for removal of low boiling fractions. The residue of distillation weighed 4.18g. It was found by assay to contain about 32 percent by weight of nonanedicarboxylic acid, 37 percent by weight of decanedicarboxylic acid and small amounts of unaltered 12-hydroxystearic acid, suberic acid, azelaic acid, sebacic acid, etc.

The reaction solution was distilled. In the gas chromatogram obtained of the distillate, there were detected two main peaks of caproic acid and enanthic acid and three very small peaks of unknown components.

EXAMPLE 9:

A flask was charged with 5.03g of 9,10-dihydroxystearic acid, 0.009g of manganese acetate (tetrahydrate) and 25 ml of 95 percent aqueous solution of acetic acid. The first-stage reaction was carried out at about 47°C for 3 hours and the second-stage reaction at 85°C for 30 minutes respectively.

After the reaction, the reaction solution was distilled (∼ 130°C/5 mm.Hg) for the removal of the solvent and low boiling fractions. The residue of distillation, 3.4g in weight, was treated with hot water to extract therefrom a fraction soluble in hot water. The solution obtained by this hot-water extraction was stripped of water by distillation. The residue from this stripping was dried to afford 2.79g of crystals (crude azelaic acid). Assay by gas chromatography revealed that this crop of crude crystals contained about 95 percent by weight of azelaic acid. When the crystals were refined by recrystallization from a small amount of water, the product showed a neutralization number of 597.5 and a melting point of 104.5°–106.0°C. It proved to be azelaic acid of high purity.

At the time of hot-water extraction, there was obtained 0.35g of water-insoluble fraction. This fraction was found to contain unaltered 9,10-dihydroxystearic acid and secondary-reaction products. The distillate obtained in the former distillation of reaction product was found to contain pelargonic acid as the main component plus small amounts of enanthic acid and caprylic acid. The weight of pelargonic acid contained therein was about 1.9g.

EXAMPLE 10:

A flask was charged with 5.00 g of 9,10-dihydroxystearic acid and 25 ml of 95% aqueous solution of formic acid. The mixture was treated for reaction by repeating the procedure of Example 9. Consequently, there were obtained 2.40g of crude azelaic acid, about 1.6g of pelargonic acid and about 0.8g of water-insoluble fraction (composed of unaltered raw material and other substances).

Table 1

| Run No. | Raw material (g) | Solvent (ml) | Catalyst | Reaction conditions First stage °C/min | Second stage °C/min | Acid component Yield (g) | Main component $C_n$ Content,% | Product Neutralization | Recrystallized product Melting |
|---|---|---|---|---|---|---|---|---|---|
| 1 | 1,5-pentadiol 4.01 | 85% acetic acid, 25 | — | 25/660 | 86/60 | 4.50 | $C_5$ 70 | 852.4 | 96.5–98.0 |
| 2 | 1,5-pentadiol 4.00 | 85% acetic acid 25 | Mn | 25/560 | 86/40 | 4.70 | $C_5$ 81 | 851.0 | 96.5–98.5 |
| 3 | 1,7-heptanediol 5.12 | 90% formic acid 25 | — | 30/490 | 86/50 | 6.35 | $C_7$ 75 | 710.5 | 103.0–105 |
| 4 | 1,10-decanediol 5.21 | 90% acetic acid 25 | — | 35/380 | 86/50 | 6.30 | $C_{10}$ 70 | 570.4 | 131.0–134.0 |
| 5 | 1,10-decanediol 5.20 | 90% acetic acid 25 | Mn | 35/380 | 86/50 | 6.25 | $C_{10}$ 79 | 562.2 | 131.5–134.0 |

Table 2

| Run No. | Raw material (g) | Solvent | Catalyst | Reaction conditions First stage °C/min | Second stage °C/min | Yield % | Monobasic acid Main component $C_n$ Content, % | Neutralization number |
|---|---|---|---|---|---|---|---|---|
| 1 | 1-dodecanol 4.30 | 90% acetic acid | * | 35/240 | 85/30 | 82 | $C_{12}$ 70 | 303.2 |
| 2 | 1-dodecanol 4.25 | 90% acetic acid | — | 35/240 | 85/30 | 74 | $C_{12}$ 68 | 298.0 |
| 3 | 1-decanol 4.00 | 80% acetic acid | — | 30/289 | 85/30 | 77 | $C_{10}$ 80 | 341.5 |
| 4 | 1-hexadecanol 4.90 | 90% acetic acid | — | 44/225 | 85/30 | 75 | $C_{16}$ 80 | 220.5 |
| 5 | 2-ethylhexanol 4.47 | 80% acetic acid | — | 25/365 | 87/30 | 99 | 2-ethyl-hexanic acid | 390.0 |
| 6 | 1-octadecanol 5.40 | 95% acetic acid | — | 49/255 | 86/50 | 74 | $C_{18}$ 76 | 215.7 |
| 7 | 1-propanol 3.00 | Water | — | 36/380 | 83/30 | 42** | $C_3$ — | 719.0 |

*Cobalt acetate (tetrahydrate)
**mol % (GLC analysis)

What is claimed is:

1. A method for the manufacture of dibasic acid, which method comprises the steps of:
   A. dissolving $\alpha, \omega$-glycol in a solvent selected from the group consisting of water, formic acid, acetic acid and propionic acid;
   B. bringing the resultant solution of Step (A) into contact with ozone-containing gas at temperatures of 10°C – 70°C;
   C. bringing the solution of Step (B) into contact with oxygen-containing gas at temperatures of 70°C – 110°C; and
   D. removing the solvent from the resultant reaction solution of Step (C).

2. A method set forth in claim 1, wherein Steps (A) - (C) are carried out in the presence of a catalyst selected from the group consisting of manganese salt, cobalt salt, chromium salt, iron salt, and copper salt respectively of acetic acid.

3. A method set forth in claim 1, wherein the amount of the catalyst is in the range of from $0.5 \times 10^{-3}$ g.atom to $5 \times 10^{-3}$ g.atom as metal element per mol of the $\alpha, \omega$-glycol.

4. A method set forth in claim 1, wherein the proportion of $\alpha,\omega$-glycol added to the solvent does not exceed 60g per 100ml of solvent.

5. A method set forth in claim 1, wherein the ozone content of the ozone-containing gas is 1 to 6 percent by weight.

6. A method for the manufacture of fatty acid, which method comprises the steps of:
   A. dissolving primary alcohol in a solvent selected from the group consisting of water, formic acid, acetic acid and propionic acid;
   B. bringing the resultant solution of Step (A) into contact with ozone-containing gas at temperatures of 10°C – 70°C;
   C. bringing the solution of Step (B) into contact with oxygen-containing gas at temperatures of 70°C –110°C; and
   D. removing the solvent from the resultant reaction solution of Step (C).

7. A method set forth in claim 6, wherein Step (A) - (C) are carried out in the presence of a catalyst selected from the group consisting of manganese salt, cobalt salt, chromium salt, iron salt, and copper salt respectively of acetic acid.

8. A method set forth in claim 7, wherein the amount of the catalyst is in the range of from $0.5 \times 10^{-3}$ g.atom to $5 \times 10^{-3}$ g.atom as metal element per mol of the primary alcohol.

9. A method set forth in claim 6, wherein the proportion of primary alcohol added to the solvent does not exceed 60g per 100ml of solvent.

10. A method set forth in claim 6, wherein the ozone content of the ozone-containing gas is 1 to 6 percent by weight.

11. A method for the manufacture of fatty acid, which method comprises the steps of:
    A. dissolving an aliphatic compound having up to two secondary alcohol groups in a solvent selected from the group consisting of water, formic acid, acetic acid and propionic acid;
    B. bringing the resultant solution of Step (A) into contact with ozone-containing gas at temperatures of 10°C – 70°C;
    C. bringing the solution of Step (B) into contact with oxygen-containing gas at temperatures of 70°C – 110°C; and
    D. removing the solvent from the resultant reaction solution of Step (C).

12. A method set forth in claim 11, wherein Steps (A) - (C) are carried out in the presence of a catalyst selected from the group consisting of manganese salt, cobalt salt, chromium salt, iron salt, and copper salt respectively of acetic acid.

13. A method set forth in claim 12, wherein the amount of the catalyst is in the range of from $0.5 \times 10^{-3}$ g.atom to $5 \times 10^{-3}$ g.atom as metal element per mol of the aliphatic compound.

14. A method set forth in claim 11, wherein the proportion of aliphatic compound added to the solvent does not exceed 60g per 100ml of the solvent.

15. A method set forth in claim 11, wherein the ozone content of the ozone-containing gas is 1 to 6% by weight.

* * * * *